(12) United States Patent
Balton et al.

(10) Patent No.: US 8,406,971 B2
(45) Date of Patent: Mar. 26, 2013

(54) SPEED CONTROL MANAGEMENT SYSTEMS AND METHODS

(75) Inventors: Christopher Balton, Bellingham, WA (US); Zachary Slaton, Kirkland, WA (US); Nathan Paul, Kirkland, WA (US); Ethan A. Ott, Bellingham, WA (US)

(73) Assignee: PACCAR Inc., Bellevue, WA (US)

( * ) Notice: Subject to any disclaimer, the term of this patent is extended or adjusted under 35 U.S.C. 154(b) by 199 days.

(21) Appl. No.: 12/876,001

(22) Filed: Sep. 3, 2010

(65) Prior Publication Data

US 2012/0059560 A1    Mar. 8, 2012

(51) Int. Cl.
*G06F 7/00* (2006.01)
*G06F 17/00* (2006.01)
*G06F 19/00* (2006.01)

(52) U.S. Cl. ............ 701/54; 701/51; 477/110; 477/159

(58) Field of Classification Search .......... 701/51, 701/54, 103; 477/110, 120, 154, 156, 159
See application file for complete search history.

(56) References Cited

U.S. PATENT DOCUMENTS

| | | |
|---|---|---|
| 4,569,255 A | 2/1986 | Holmes |
| 4,630,508 A | 12/1986 | Klatt |
| 4,631,515 A | 12/1986 | Blee |
| 4,632,231 A | 12/1986 | Hattori |
| 4,723,215 A | 2/1988 | Hibino |
| 4,853,673 A | 8/1989 | Kido |
| 4,905,544 A | 3/1990 | Ganoung |
| 4,947,331 A | 8/1990 | Speranza |
| 5,067,460 A | 11/1991 | Van Duyne |
| 5,393,277 A | 2/1995 | White |
| 5,544,056 A | 8/1996 | Seireg |
| 5,732,676 A | 3/1998 | Weisman |
| 5,995,896 A | 11/1999 | Depping |
| 6,042,505 A | 3/2000 | Bellinger |
| 6,176,812 B1 * | 1/2001 | Taki et al. ............ 477/159 |
| 6,298,300 B1 | 10/2001 | Ohyama |
| 6,356,831 B1 | 3/2002 | Michelini |

(Continued)

FOREIGN PATENT DOCUMENTS

| | | |
|---|---|---|
| JP | 11-257112 A | 9/1999 |
| KR | 20030038899 A | 5/2003 |

(Continued)

OTHER PUBLICATIONS

International Search Report and Written Opinion mailed Apr. 20, 2012, issued in corresponding International Application No. PCT/US2011/050371, filed Sep. 2, 2011, 7 pages.

*Primary Examiner* — Thomas Tarcza
*Assistant Examiner* — Kevin Myhre
(74) *Attorney, Agent, or Firm* — Christensen O'Connor Johnson Kindness PLLC (57) ABSTRACT

Systems and methods are provided for controlling an amount of torque generated by an engine of a vehicle. The amount of torque may be controlled by limiting an amount of fuel or air or a combination thereof being provided to the engine. In some situations, controlling the amount of torque generated by the engine may be utilized to gradually limit the vehicle's acceleration, which in turn, may influence driver shifting strategies.

20 Claims, 8 Drawing Sheets

U.S. PATENT DOCUMENTS

| | | |
|---|---|---|
| 6,813,550 B2 | 11/2004 | Minami |
| 7,052,434 B2 | 5/2006 | Makino |
| 7,454,962 B2 | 11/2008 | Nishiyama |
| 7,646,289 B2 | 1/2010 | Tamai |
| 7,680,575 B2 | 3/2010 | Han |
| 2008/0058159 A1* | 3/2008 | Watanabe et al. ............ 477/156 |
| 2009/0157267 A1 | 6/2009 | Shin |
| 2009/0299560 A1* | 12/2009 | Tomatsuri et al. ............ 701/22 |
| 2010/0036571 A1 | 2/2010 | Han |

FOREIGN PATENT DOCUMENTS

| | | |
|---|---|---|
| KR | 20040056712 A | 7/2004 |
| WO | 83/01686 A1 | 5/1983 |

* cited by examiner

SPEED CONTROL MANAGEMENT SYSTEMS AND METHODS

BACKGROUND

Inefficient uses of vehicles can result in higher fuel consumption than is needed and, thus, may result in increased operating costs. In the field of surface transportation, and particularly in the long-haul trucking industry, even small improvements in fuel efficiency can reduce annual operating costs significantly.

Over the years, numerous advances have been made to improve fuel efficiency in internal combustion powered vehicles. In many situations, fuel consumption may be reduced by operating the vehicle at lower engine speeds. Techniques for influencing driver shifting strategies have been identified as being useful for reduce fuel consumption. For instance, a visual signal, such as a shift light on a dashboard, may be illuminated when a driver has reached a maximum engine speed, encouraging the driver to shift sooner than the driver would have without the visual signal. Another known technique includes the use of an engine speed governor that prevents the engine from rotating above a predetermined engine speed. This technique, however, may be too limiting to the driver for some applications and thus, may frustrate the driver and restrict the driver's ability to control the vehicle.

SUMMARY

This summary is provided to introduce a selection of concepts in a simplified form that is further described below in the Detailed Description. This summary is not intended to identify key features of the claimed subject matter, nor is it intended to be used as an aid in determining the scope of the claimed subject matter.

In accordance with aspects of the present disclosure, a method of controlling an amount of torque generated by an engine of a vehicle is provided. The method may include determining whether a speed of the engine exceeds an engine speed control target. When the speed of the engine exceeds the engine speed control target, a starting speed may be identified. The starting speed may be indicative of the rotational speed of the engine at a time in which the rotation speed of the engine exceeded the speed control target. The method may further include increasing the engine speed control target over time. Torque generated by the engine may be limited to produce a fuel powered rotational speed of the engine that is equal to or less than the engine speed control target at any given point in time.

In accordance with another aspect of the present disclosure, an electronic control unit is provided. The electronic control unit includes a data store configured to store a current starting engine speed and a plurality of speed control targets. Each speed control target may be a function of gear ratio. The electronic control unit may further include an engine speed limit generator configured to obtain a predetermined speed control target for the current vehicle transmission gear ratio and to determine dynamic engine speed targets as a function of time, gear ratio, and current starting engine speed. The electronic control unit may further include a torque governor coupled to the engine speed limit generator and configured to generate a signal indicative of a torque limit to be supplied to one or more devices associated with the engine.

In accordance with another aspect of the present disclosure a system for reducing acceleration of a vehicle having a current transmission gear ratio is disclosed. The system may include an engine, a fuel control device coupled to the engine, and a speed control electronic control unit (ECU) coupled to the fuel control device. The fuel control device may be configured to control an amount of fuel supplied to the engine in response to signals. The speed control ECU may be configured to obtain the current transmission gear ratio and identify a speed control target as a function thereof. The speed control ECU may be further configured to determine dynamic engine speed targets as a function of the current transmission gear ratio and of time and to generate a signal indicative of an amount to limit fuel supplied to the engine based on the determined dynamic engine speed targets at a given point in time. The speed control ECU may be further configured to provide the signal to the fuel control device.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended only as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion proceeds with reference to examples of speed control management systems and methods suitable for use in vehicles having manual transmissions, such as Class 8 trucks. Generally, the examples of the speed control management systems and methods described herein aim to control the acceleration of the vehicle in certain situations, which may in turn, influence driver shifting strategies. For example, the amount of fuel consumed is at least partially dependent on the speed of the engine. As such, improvements in fuel efficiency can be realized if the engine's speed is maintained within a "sweet spot" or optimal range for a given transmission gear ratio. To potentially influence driver shifting strategies that, in turn, may increase fuel efficiency through a reduction in engine speed, the amount of torque generated by the engine is limited in certain situations, such as when the engine speed is above the "optimal" range for the current transmission ratio. In some embodiments, the torque generated by the engine is limited by a reduction in fuel, air, or combination of fuel and air supplied to the engine as the engine's speed increases. By limiting the fuel and/or air supplied to the engine when the engine speed is above the optimal range, the rate in which the driver may increase vehicle speed (i.e., acceleration) is restricted. As a result, the driver may be more likely to shift into a more appropriate gear for the current driving conditions.

Although exemplary embodiments of the present disclosure will be described hereinafter with reference to Class 8 trucks, it will be appreciated that aspects of the present disclosure have wide application, and therefore, may be suitable for use with many types of mechanically powered or hybrid powered vehicles having manual transmissions, such as passenger vehicles, buses, commercial vehicles, light and medium duty vehicles, etc. Accordingly, the following descriptions and illustrations herein should be considered illustrative in nature, and thus, not limiting the scope of the claimed subject matter.

Prior to discussing the details of various aspects of the present disclosure, it should be understood that several sections of the following description are presented largely in terms of logic and operations that may be performed by conventional electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to obscure unnecessarily various aspects of the present disclosure. Furthermore, it will be appreciated the embodiments of the present disclosure may employ any of the features described herein.

Figure 1:
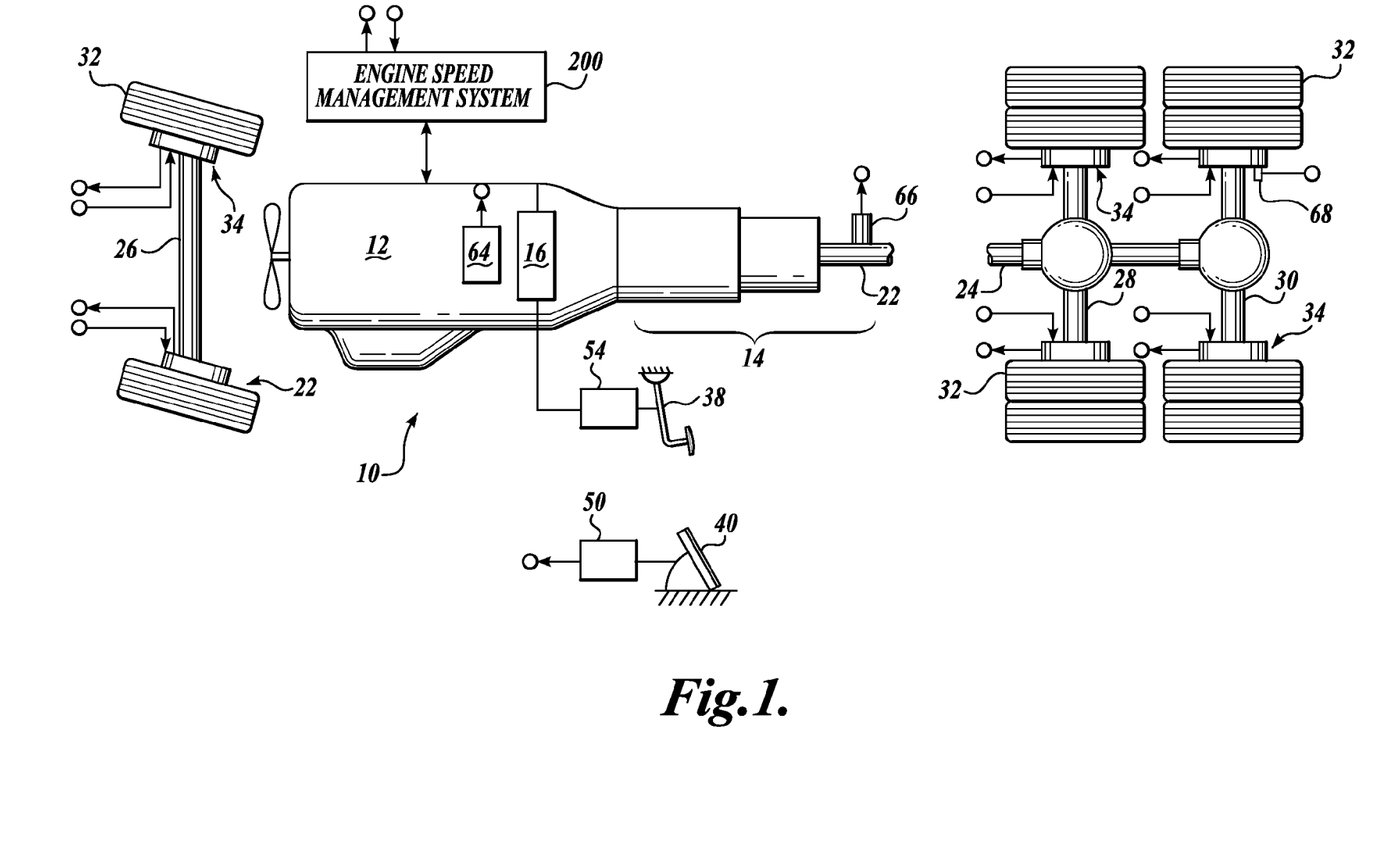
FIG. 1 is a schematic diagram of one example of a vehicle suitable for comprising a speed management system in accordance with aspects of the present disclosure.

As briefly described above, embodiments of the present disclosure are directed to engine speed management systems and methods for improving fuel economy by optimizing and influencing driver shifting through gradual engine speed control. FIG. 1 is a schematic diagram of a vehicle 10, such as a Class 8 tractor, suitable for comprising a speed management system 200 in accordance with one embodiment of the present disclosure. Although a vehicle such as depicted in FIG. 1 represents one of the possible applications for the systems and methods of the present disclosure, it should be appreciated that aspects of the present disclosure transcend any particular type of vehicle employing an internal combustion engine (e.g., gas, diesel, etc.) or hybrid drive train.

The vehicle 10 in the embodiment shown in FIG. 1 may include an electronically controlled engine 12 coupled to a manual transmission 14 via a clutch mechanism 16. The manual transmission 14 may include an input shaft (not shown) and an output shaft 22 coupled to a drive shaft 24. The vehicle 10 includes at least two axles such as a steer axle 26 and at least one drive axle, such as axles 28 and 30. Each axle supports corresponding wheels 32 having service brake components 34 for monitoring the vehicle's operating conditions and to effect control of the vehicle braking system. The vehicle 10 may also include conventional operator control inputs, such as a clutch pedal 38 and an accelerator pedal 40. The vehicle 10 may also include a variety of sensors, such as an accelerator pedal position sensor 50, a clutch pedal position sensor 54, an engine speed sensor 64, an output shaft sensor 66, and wheel speed sensor 68. As indicated above, the vehicle 10 is further equipped with an engine speed management system 200 that interfaces with the engine 12 and the various sensors described herein. As will be further described below, the engine speed management system 200 may be configured to control the amount of fuel being supplied to the engine 12 to influence driver shifting strategies.

Figure 2A:
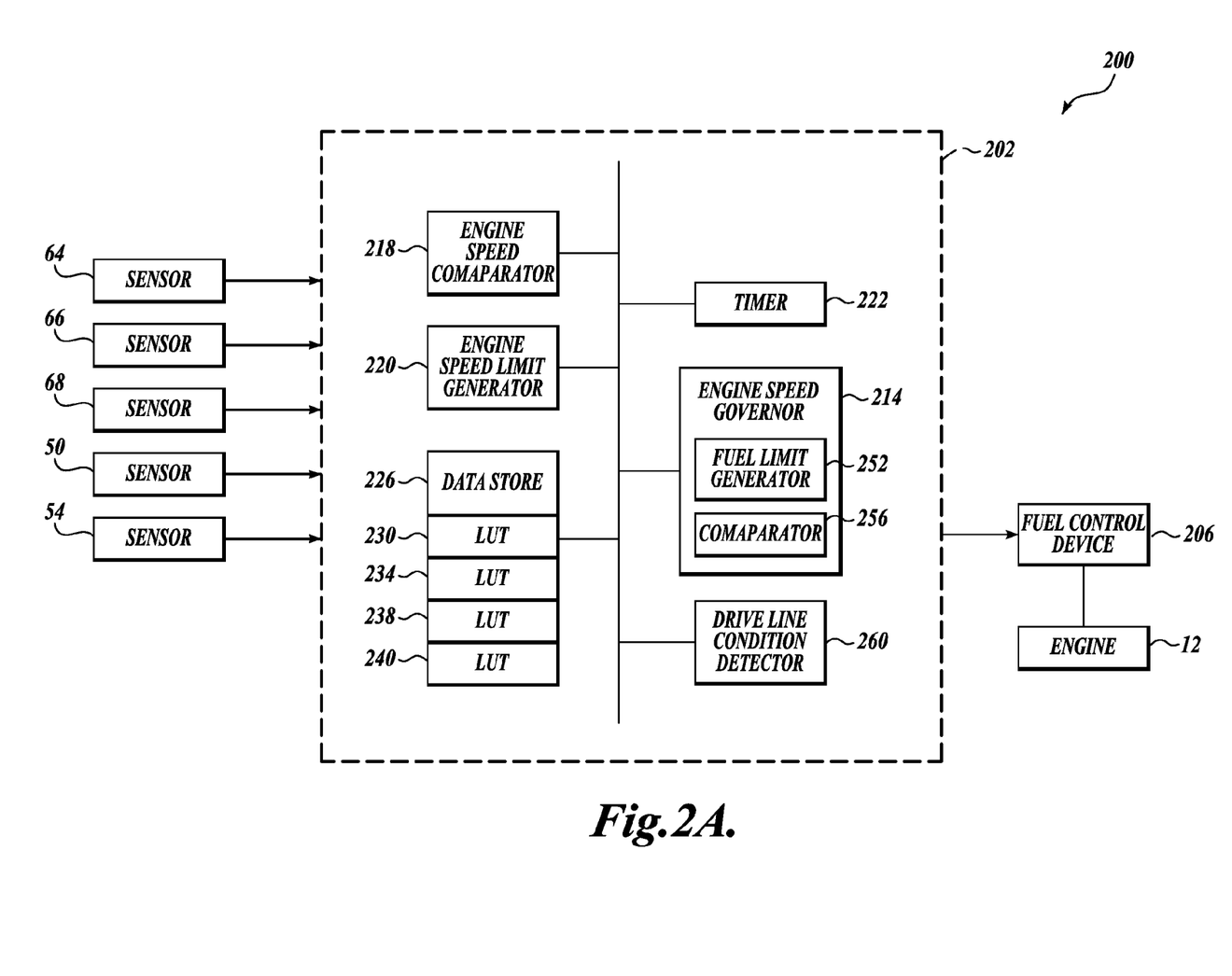
FIG. 2A is a functional block diagrammatic view of one example of a speed management system in accordance with aspects of the present disclosure.

Turning now to FIG. 2A, there is a functional block diagrammatic view of one example of a speed management system 200 in accordance with aspects of the present disclosure. As shown in FIG. 2A, the speed management system 200 may include an electronic control unit (ECU) 202 communicatively coupled to a plurality of sensors, including but not limited to the accelerator pedal position sensor 50, the clutch pedal position sensor 54, the engine speed sensor 64, the output shaft sensor 66, and/or wheel speed sensors 68. The ECU 202 can also be communicatively coupled to a fuel control device 206. The fuel control device 206 is associated with the engine 12 for selectively supplying fuel thereto. As will be explained in more detail below, the fuel control device 206 may be configured to control the amount of fuel supplied to the engine 12 and thus the speed of the engine 12 in response to signals generated by the ECU 202.

It will be appreciated that the ECU 202 can be implemented in a variety of hardware, software, and combination hardware/software configurations, for carrying out aspects of the present disclosure. In the embodiment shown in FIG. 2A, the ECU 202 may include but is not limited to an engine speed governor 214, an engine speed comparator 218, an engine speed limit generator 220, a timer 222, and a data store 226. In one embodiment, the data store 226 may include an engine speed shift target look-up table 230 (LUT 230), an engine speed target slope LUT 234, and a rewriteable memory section for storing current engine speed. The engine speed shift target LUT 230 and the engine speed target slope LUT 234 can be generated as a function of transmission gear ratio.

In another embodiment, the data store 226 may additionally include an optional engine speed shift target offset LUT 238 and an optional engine speed shift target offset time delay LUT 240. The engine speed shift target offset LUT 238 and the engine speed shift target offset time delay LUT 240 can be generated as a function of engine speed and transmission gear ratio.

Upon a determination from the engine speed comparator 218 that current engine speed is greater than the engine speed shift target value obtained from LUT 230 based on the current transmission gear ratio, the engine speed limit generator 220 determines an engine speed target as a function of time, referred to as the dynamic engine speed target. The dynamic engine speed target provides engine speed limits that increase as a function of time, i.e., an acceleration profile. In one embodiment, the dynamic engine speed target (DEST) may be calculated from the following formula.

DEST=Stored Engine Speed(SES)+Engine Speed Target Slope*Time  Formula (1)

Figure 7:
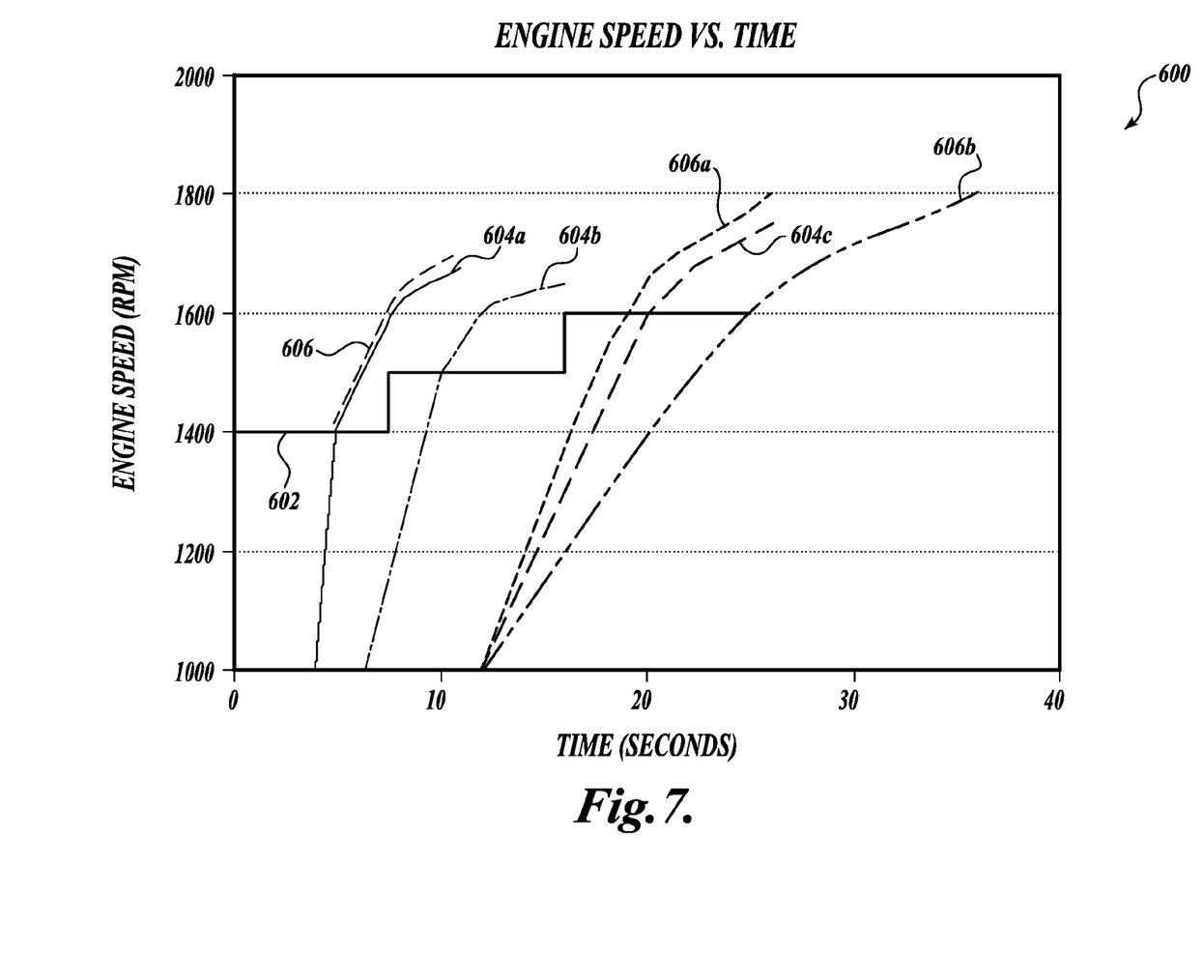
FIG. 7 is a graphical representation of engine speed control targets as a function of time in accordance with aspects of the present disclosure.

By increasing engine speed limits as a function of time, an engine speed may be gradually limited, thus providing a driver an indication to shift in order to optimize fuel efficiency while still allowing the driver to increase engine speed after receiving the indication to shift. FIG. 7 illustrates examples of the dynamic engine speed target as a function of time for three transmission gears (e.g., 1st gear, 2nd gear, 3rd gear) as represented by lines 604*a*-604*c*, respectively, that extend above the target engine speed line 602.

In one embodiment, in order the determine the dynamic engine speed target, the engine speed limit generator 220 receives (1) an engine speed target slope from engine speed target slope LUT 234 based on the vehicle's current transmission gear ratio; (2) a time value from the timer 222; and (3) the stored engine speed from the data store 226. In this embodiment, the timer 222 is set to zero when the comparator 218 determines that the current engine speed is greater than the engine speed shift target value from the LUT 230. Contemporaneously with setting the timer 222 to zero, the current engine speed utilized by the comparator 218 is stored in the memory section of the data store 226. In accordance with one embodiment, the engine speed shift targets for each gear ratio are partially illustrated graphically by stair step line 602 in FIG. 7. The first part of the line 602 indicates a preferred or optimized engine speed for shifting from first gear to second gear at 1400 RPMs.

As described briefly above, the engine speed target and the engine speed target slope are determined as a function of current transmission gear ratio. It will be appreciated that such a ratio may be obtained in a variety of ways. In one embodiment, the current transmission gear ratio may be calculated as the ratio of engine speed to transmission output shaft speed or drive shaft speed. In that regard, the ECU 202 may be configured to receive signals indicative of the engine speed from sensor 64 and transmission output shaft speed from sensor 66. Other techniques for obtaining the current transmission gear ratio may be practiced with embodiments of the present disclosure. In one embodiment, the engine target speed slope may be calculated as follows:

Given:

Transmission gear ratio=Tr;

Rear axle ratio=Ar;

Vehicle mass=M;

Coefficient of aerodynamic drag=Cd;

Vehicle frontal area=A;

Vehicle velocity=V;

Vehicle rolling resistance=Frr;

Engine brake torque over time=T(t);

Engine speed=N;

Tire loaded rolling radius=Rt.

The engine target speed slope (i.e. an acceleration curve) can be obtained from:—

$$\frac{dV}{dt} = \frac{\frac{T(t)\cdot Tr\cdot Ar}{Rt} - \frac{1}{2}\cdot Cd\cdot A\cdot V^2 - Frr}{M}$$  Formula (2)

For each gear ratio of a specific vehicle at a "loaded" mass and an "unloaded" mass, two curves may be generated. These curves are illustrated as 606*a* and 606*b* of FIG. 6. These curves of vehicle acceleration can be converted to engine acceleration by:

$$\frac{dN}{dt} = \frac{\frac{dV}{dt}\cdot Tr\cdot Ar}{Rt\cdot 2\cdot pi}$$  Formula (3)

Still referring to FIG. 2A, the engine speed limit generator 220 outputs the dynamic engine speed target to the engine speed governor 214, which in turn, outputs a signal to the fuel control device 206 that indicates the fuel quantity to be supplied to the engine 12. In the embodiment shown in FIG. 2A, the engine speed limit generator 220 includes a torque limit generator, such as a fuel limit generator 252, and a comparator 256. Based on the dynamic engine speed target received from the engine speed limit generator 220, the fuel limit generator 252 generates a fuel limit dependent on the dynamic engine speed target and transmits the fuel limit to the comparator 256. The comparator 256 compares the fuel limit to the fuel demand from the driver as indicated by the accelerator pedal position sensor 50, and outputs the lower of the two values to the fuel control device 206.

In some examples, the ECU 202 may be configured to disable the engine speed governor 214 when the vehicle is operating in predetermined operating conditions. For example, the ECU 202 may further include a driveline condition detector 260. If the driveline condition detector 260 determines the driveline is in the open position, the driveline condition detector may send a signal to the engine speed governor 214 to selectively disable the engine speed governor 214. To that end, the engine speed governor 214 outputs the driver fuel demand as the fuel quantity value to the fuel control device 206.

In another embodiment, net chassis force ($F_{chassis}$) in combination with vehicle acceleration may be used to determine whether to disable the engine speed governor 214. It will be appreciated by those skilled in the art that the change in vehicle speed (Δ vehicle speed) may be obtained by first obtaining a minimum force ($F_n$ min) expected to accelerate an unloaded vehicle on a flat grade as a function of gear ratio. For instance, this may be obtained from a minimum force look-up table (not shown). A minimum time ($t_n$ min) after which a force greater than or equal to the net chassis force ($F_{chassis}$) would be expected to increase the vehicle speed by a predetermined amount may be determined. For instance, this may be obtained from a minimum time look-up table (not shown).

The minimum change in vehicle speed (Δ vehicle speed$_{min}$) may be then determined based on the minimum force ($F_n$ min) applied over minimum time ($t_n$ min). As indicated above, in some embodiments if the change in vehicle speed (Δ vehicle speed$_{min}$) is above a predetermined value—for instance, greater than zero—and the net chassis force ($F_{chassis}$) is above a predetermined value, then the dynamic engine speed target is determined as a function of gear ratio according to the equation shown above. Otherwise, the engine speed governor 214 is disabled. This embodiment is further discussed in reference to FIGS. 6A-6B.

Figure 2B:
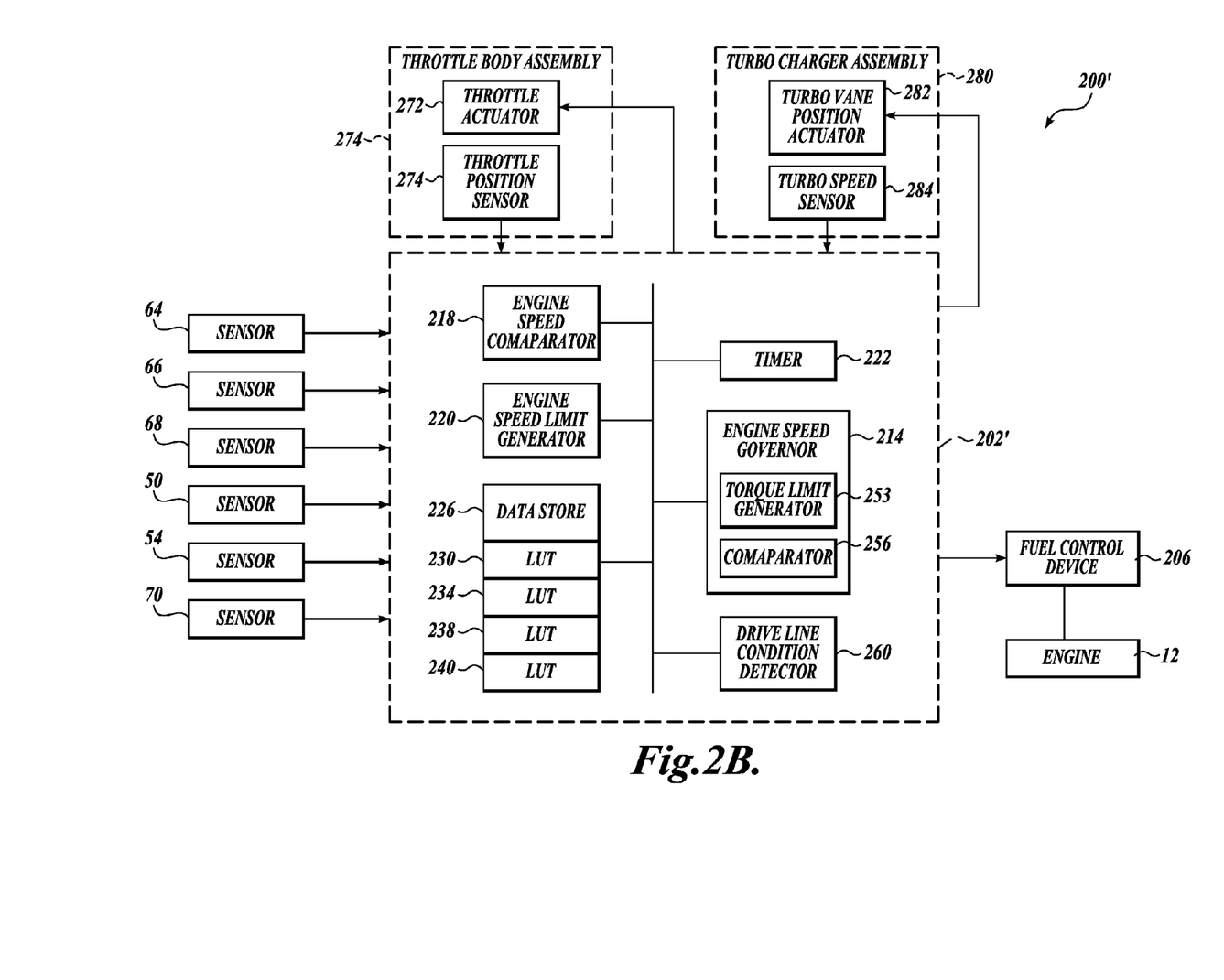
FIG. 2B is a functional block diagrammatic view of one example of a speed management system in accordance with aspects of the present disclosure.

Turning now to FIG. 2B, another configuration of a speed management system 200' in accordance with aspects of the present disclosure will now be described. The speed management system 200' is substantially similar in construction and operation as the speed management system 200 of FIG. 2A except for the differences that will now be described. As best shown in FIG. 2B, the ECU 202' differs from ECU 202 of FIG. 2A in that ECU 202' of FIG. 2B includes a torque limit generator 253 rather than a fuel limit generator 252. The torque limit generator 253 may be configured to generate a torque limit dependent on the dynamic engine speed target and transmit the limit to the comparator 256. The torque limit generator 253 may be configured to limit torque by reducing the amount of fuel, air, or a combination thereof supplied to the engine 12. The ECU 202' may be also communicatively coupled to a mass flow sensor 70. The mass flow sensor 70 may be configured to measure a total air flow rate into the engine. In one embodiment, the mass air flow sensor 70 may be positioned in the engine's intake manifold.

In the embodiment shown in FIG. 2B, the speed management system 200' may further include a throttle body assembly 270. As shown, the throttle body assembly 270 may include a throttle actuator 272 and a throttle position sensor 274, both communicatively connected to the ECU 202'. The throttle speed sensor 274 may provide feedback of the position of the throttle actuator 272 to the ECU 202'. The throttle actuator 272 is associated with the engine 12 for selectively supplying air thereto. As will be explained in more detail below, the throttle actuator 272 may be configured to control the amount of air supplied to the engine 12 and thus the speed of the engine 12 in response to signals generated by the ECU 202'.

In some embodiments, the engine 12 of the vehicle may be optionally turbocharged. In this regard, the speed management system 200' may further include a turbo charger assembly 280. In the embodiment shown, the turbo charger assembly 280 may include a turbo vane position actuator 282 and a turbo speed sensor 284, both communicatively connected to the ECU 202'. The turbo speed sensor 284 outputs signals indicative of the speed of the turbo charger to the ECU 202'. The turbo vane position actuator 282 is associated with the engine 12 for selectively supplying compressed air thereto. As will be explained in more detail below, the turbo vane position actuator 282 may be configured to control the amount of compressed air supplied to the engine 12 and thus the speed of the engine 12 in response to signals generated by the ECU 202'.

Based on the dynamic engine speed target received from the engine speed limit generator 220, the torque limit generator 253 may be configured to generate an air flow limit and transmit the air flow limit to the comparator 256. The comparator 256 may be configured to compare the air flow limit to that requested from the driver as indicated by the accelerator pedal position sensor 50 and output the lower of the two values to the throttle actuator 272 and/or the turbo vane position actuator 282. It will be further appreciated by those skilled in the art that other methods could be used to control air flow or torque, such as using variable valve timing, cylinder deactivation, intake manifold runner geometry changes, exhaust system valves/brakes, and a variety of other airflow devices. The engine speed governor 214, which may also be referred to a torque governor, further outputs to the fuel control device 206 a signal indicative of the fuel quantity corresponding to the air flow value in accordance with one or more fuel maps stored in data store 226. It will be appreciated that in other embodiments, the torque limit generator 253 may be configured to control the speed of the engine 12 by limiting the amount of fuel or a combination of fuel and air being supplied to the engine 12.

Figure 3:
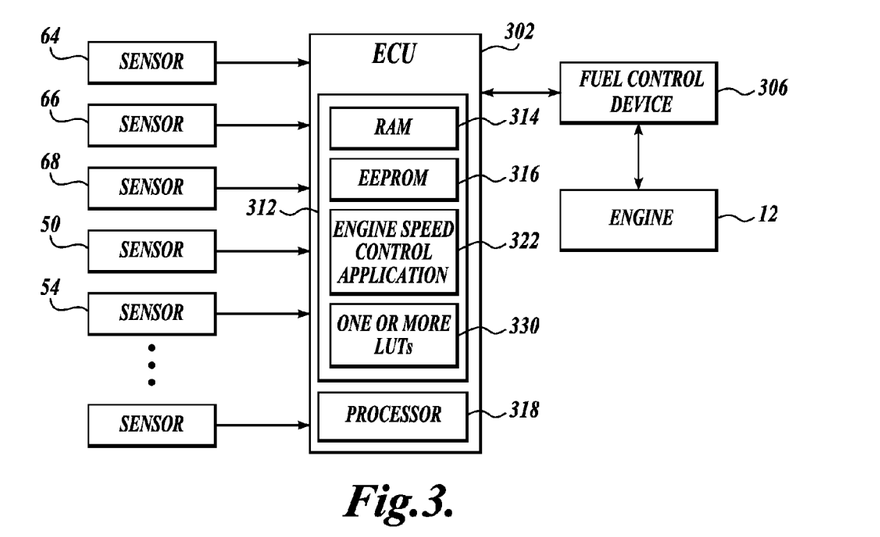
FIG. 3 is a functional block diagrammatic view of another example of a speed management system in accordance with aspects of the present disclosure.

Turning now to FIG. 3, another configuration of the ECU, generally designated 302, will be described in some detail. As best shown in FIG. 3, the ECU 302 may include a memory 312 and a processor 318. In one suitable embodiment the memory 312 comprises a Random Access Memory ("RAM") 314 and an Electronically Erasable, Programmable, Read-Only Memory ("EEPROM") 316. Those skilled in the art and others will recognize that the EEPROM 316 is a non-volatile memory capable of storing data when a vehicle is not operating. Conversely, the RAM 314 is a volatile form of memory for storing program instructions that are accessible by the processor 318. Typically, a fetch and execute cycle in which instructions are sequentially "fetched" from the RAM 314 and executed by the processor 318 is performed. In this regard, the processor 318 is configured to operate in accordance with program instructions that are sequentially fetched from the RAM 314.

The memory 312 may include program modules, applications, and the like that include algorithms configured to perform operations that are executable by the processor 318. In that regard, the memory 312 includes an engine speed control application 322 for controlling acceleration of the vehicle and, possibly as a result, influence driver shifting strategies to promote, for example, fuel efficiency and/or the like. Additionally, the memory 312 may include multi-dimensional performance maps or look-up tables (LUTs) that are accessed by the processor 318.

The engine speed control application 322 includes instructions that when executed by the processor 318 cause the system to perform one or more functions. In one embodiment, the application 318 is capable of polling for or receiving data from one or more system components, analyzing the data received from the system components, and/or generating control signals to be transmitted to the components of the system 300, such as the fuel control device 306. The application 322 further accesses stored data, including data from one or more LUTs.

During operation of the vehicle 10, the application 322 is programmed to obtain and/or calculate a ratio indicative of the transmission gear ratio in which the vehicle is currently operating. It will be appreciated that the ratio may be obtained from a variety of ways. In some embodiments, the ECU 302 may be configured to receive signals from a plurality of sensors indicating the operating conditions of the vehicle 10. For instance, one or more sensors may be configured to provide signals to the ECU 302 indicative of vehicle speed, transmission output shaft speed, and/or engine speed, such as via the wheel sensor 68, the output shaft sensor 66, or engine speed sensor 64, respectively. In one embodiment, the processor 318 may be configured to receive signals indicative of the engine speed and transmission output shaft speed or vehicle speed and to determine the gear ratio therefrom. For instance, in one embodiment, the transmission gear ratio is obtained from the ratio of the engine speed to the vehicle speed. In another embodiment, the transmission gear ratio is obtained from the ratio of engine speed to transmission output shaft speed.

The application 322 may be further configured to cause the processor 318 to access one or more LUTs in memory 312 to identify a speed control (or shift) target for the determined gear ratio and to compare the engine's current speed to the speed control target. The speed control target may be a predetermined engine speed identified as an optimized engine speed for shifting to a next higher gear in order to improve fuel economy, and therefore, may also be referred to as a speed shift target. In the event the current engine speed exceeds the speed control target, the application 322 may cause the processor 318 to access an LUT in memory 312 to determine the engine speed target as a function of time, referred to as the dynamic engine speed target as described above. In one embodiment, the dynamic engine speed target may be determined by generating an engine speed control target slope as a function of the determined gear ratio and starting engine speed.

The application 322 may further cause the processor 318 to determine an engine fuel limit to maintain an engine speed equal to or less than the dynamic engine speed control target at each point in time. The ECU 302, under control of the processor 318, provides a signal indicative of the engine fuel limit at a particular point in time to the fuel control device 306 for reducing the amount of fuel being applied to the engine 12.

In one embodiment, the fuel control device 306 may limit the amount of fuel provided to the engine 12 when the engine fuel limit is less than the fuel request from the driver. In particular, the application 322 may cause the processor 318 to compare the engine fuel limit at each point in time with the fuel requested from the driver as indicated by the accelerator pedal sensor 50. As a result, the ECU 302 may be configured to send a signal indicative of the smaller of the two values to the fuel control device 306. For instance, in the event that the engine fuel limit is less than the fuel request from the driver, a signal indicative of the engine fuel limit at the particular point in time is sent to the fuel control device 306.

In some examples, the ECU 302 may be configured to detect whether the driveline is in the open position or in the closed position. When the driveline is determined to be in the open position, as indicated by, for example, the output of the transmission neutral switch (not shown), the application 322 causes the processor 318 to send a signal indicative of the driver fuel request to the fuel control device 306.

While the embodiment described above implemented the functionality of a speed limit governor, a driveline condition detector, and a comparator as program instructions within application 322, it will be appreciated that one or more of these may be implemented as separate program modules that are accessed by the application 322. Alternatively, it will be appreciated that the logic carried out by one or more of these may be implemented as digital and/or analog circuitry and/or the like. Additionally, it will be appreciated that the ECU 302 may be one or more software control modules contained within an engine control unit of the vehicle, or within one or more general purpose controllers residing on the vehicle.

Figure 4:
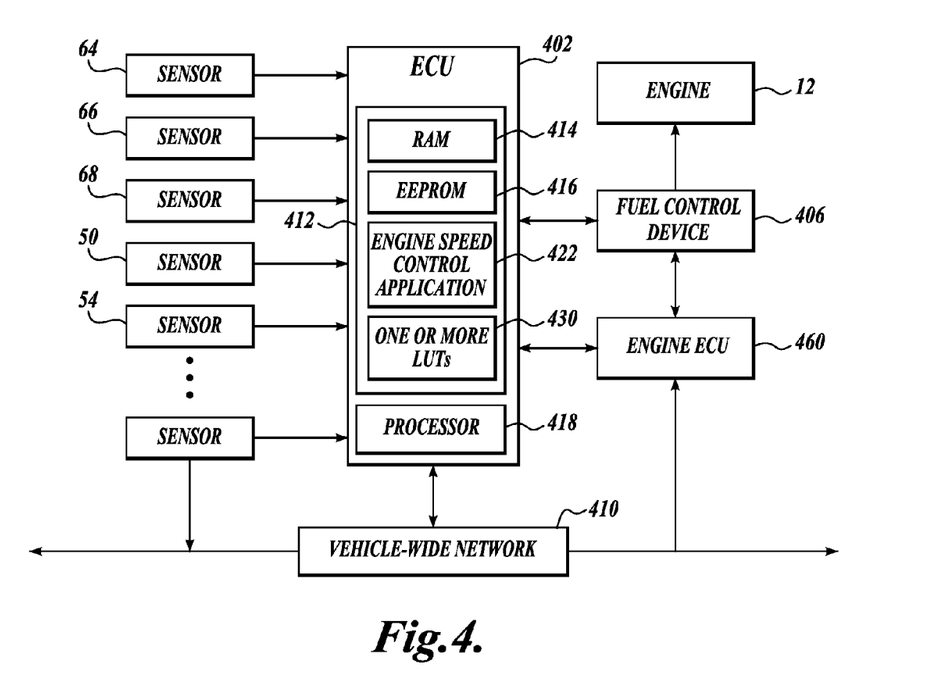
FIG. 4 is a functional block diagrammatic view of yet another example of a speed management system in accordance with aspects of the present disclosure.

Turning now to FIG. 4, a functional block diagrammatic view of another example of a speed management system 400 is shown in accordance with aspects of the present disclosure. In reference to FIG. 4, the system 400 includes a speed management ECU 402 and an engine ECU 460 coupled to a fuel control device 406. As best shown in FIG. 4, the speed management ECU 402 is connected either directly to the engine ECU 460 or indirectly via a vehicle wide network 410. Similarly, the sensors 404 may be either directly coupled to the speed management ECU 402 or indirectly via the vehicle wide network 410. In the exemplary system shown in FIG. 4, the speed management ECU 402 may also be directly coupled to the fuel control device 406. As such, the signals generated by the speed management ECU 402 may be provided directly to the fuel control device 406 or to the fuel control device 406 via the engine ECU 460 to control the amount of fuel being supplied to the engine 12.

Those skilled in the art and others will recognize that the speed management system 400 includes a vehicle-wide network 410 for the components within the vehicle to communicate through. Those skilled in the art will recognize that vehicle-wide network 410 may be implemented using any number of different communication protocols such as, but not limited to, Society of Automotive Engineer's ("SAE") J1587, SAE J1922, SAE J1939, SAE J1708, and combinations thereof. However, embodiments of the present disclosure may be implemented using other types of currently existing or yet-to-be-developed in-vehicle communication systems without departing from the scope of the claimed subject matter.

Figure 5:
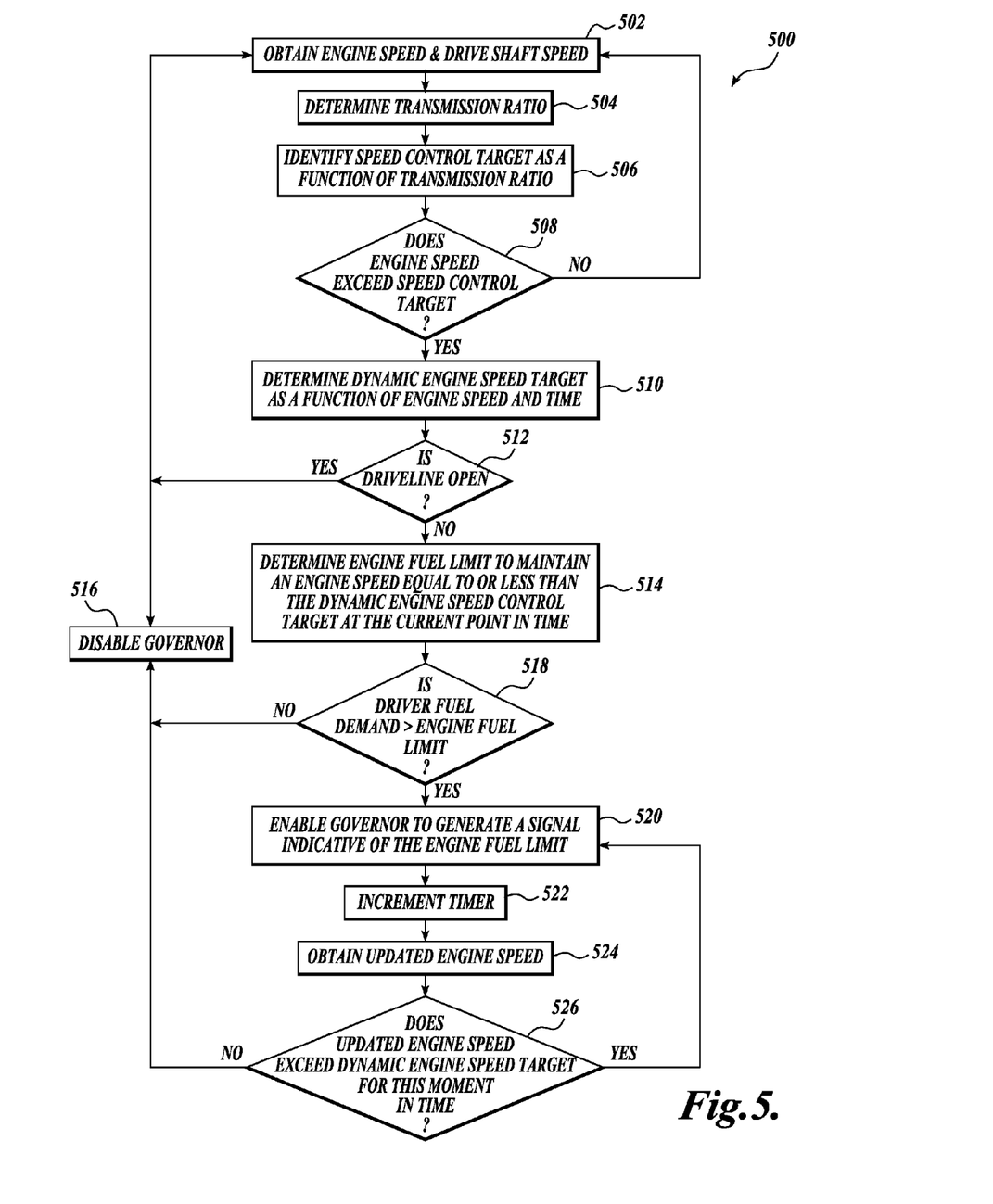
FIG. 5 is flow diagram of one exemplary method of controlling acceleration of a vehicle that may be implemented by one or more components of a speed management system in accordance with aspects of the present disclosure.

FIG. 5 is a flow diagram of one exemplary method 500 in accordance with one embodiment of the disclosure. In several embodiments, the method 500 may be implemented by the ECUs 202, 202', 302, and 402 described above. Generally described, the method 500 determines whether to limit the fuel being supplied to the engine 12. The method may begin at block 502 in which vehicle operating parameters are obtained, such as the current engine speed and transmission output or drive shaft speed. For instance, the current engine speed may be obtained via one or more sensors discussed in reference to FIG. 2. Block 502 may be followed by block 504. In block 504, the gear ratio in which the vehicle is operating may be determined. For instance, in the embodiment shown in FIGS. 2-4, the gear ratio may be calculated from engine speed versus drive shaft speed. Those skilled in the art will recognize that other methods for determine gear ratio may be used.

From block 504, the method continues to block 506. In block 506, a speed control target is determined for the transmission ratio identified in block 504. For instance, in one embodiment, the speed control target may be determined by accessing a look-up table (LUT), such as LUT 230 that defines speed control targets for each gear ratio.

Proceeding to block 508, the current engine speed may be compared to the speed control target identified in block 506. Those skilled in the art will recognize that in some embodiments, the current engine speed may be greater than the speed control target. For example, in the situation in which a driver is downshifting from second gear to first gear, once the transmission enters first gear the current engine speed may be significantly greater than the speed control target. Alternatively, the driver may have accelerated quickly in, for example, first gear and surpassed a preselected target engine shift speed (e.g., 1400 rpm).

If the current engine speed is less than the speed control target, the method returns to block 502. If the current engine speed exceeds the speed control target, then the method continues to block 510. At block 510, dynamic engine speed targets are determined as a function of the current engine speed and time. For instance, the dynamic engine speed targets may be determined by generating an engine speed target slope by accessing LUT 234 in FIG. 2 or an LUT in memory 312 of FIG. 3.

In some embodiments, two or more engine speed target slopes may be generated for each set of dynamic engine speed targets such that fuel reduction may be gradual at first and then become more aggressive over time. In one embodiment, the two or more speed target slopes may be described by a discrete function that provides a smoothed transition from the gradual reduction in fuel to the more aggressive reduction in fuel is gradual over time. That is, a transitional engine speed control target slope may be determined. The transitional engine speed control target slope may be a discrete approximation using any number of sample rates. The transitional engine speed control target slope may be obtained from the following:

Given:

$ML_n$=slope of engine acceleration curve loaded for gear ratio n $MU_n$=slope of engine acceleration curve unloaded for gear ratio n $m1_n$=slope of initial engine speed control target line $m2_n$=slope of transitional engine speed control target $m3_n$=slope of final engine speed control target line T=elapsed time since the end of line $m1_n$ $k_n$=rate of change of slope for $m2_n$ Then, $$ML_n < m3_n < m2_n < m1_n < MU_n$$

A curve between slopes $m1_n$ and $m3_n$ may be obtained by defining the transitional slope, $m2_n$, as a function of time according to the following equation:

$$m2_n[N] = k_n \cdot m2_n[N-1] + (1-k_n) \cdot m3_n[N] \qquad \text{Formula (4)}$$

With the initial condition:

$$m2_n[-1] = m1_n$$

and N=the integer time step for the discrete time control loop, with N=0 at T=0.

Next, at decision block 512, a test is performed to determine if the driveline is in an open position or closed position. If the driveline is an open position, the method may return to block 502 or a disable signal may be generated in block 516. The disable signal may be utilized, for example, by governor 220 so that any potential limiting of fuel being supplied to the engine 12 is prohibited. If the driveline is in the closed position, a signal indicative of a fuel limit value may be generated in block 514. The fuel limit value may indicate the amount to limit the fuel to be provided to the engine from normal operating conditions. For instance, the fuel limit value may indicate to limit the fuel by a percentage of the amount of fuel typically supplied to the engine 12. Alternatively, the fuel limit value may indicate that fuel quantity to be supplied to the engine 12, which is less than the amount of fuel typically supplied to the engine 12 absent the engine speed management systems described herein.

Block 518 may follow block 514. In block 518, the engine fuel limit determined in block 514 is compared to the driver fuel demand. If the driver fuel demand is less than the engine fuel limit, then block 516 follows block 518 to generate a disable signal. In this case, the fuel actually supplied to the engine from the fuel control device represents the amount demanded by the driver as indicated by the accelerator pedal position sensor 50. If, however, the driver fuel demand is more than the engine fuel limit, the method continues to block 520 to generate an enable signal to enable the speed limit governor 220 of FIG. 2.

Block 522 follows block 520. In block 522, a timer may be incremented. In block 524, an updated engine speed may be obtained, and in block 526, the updated engine speed may be compared to the dynamic engine speed target at the incremented time. If the updated engine speed is greater than the dynamic engine speed target, the method returns to block 512 so that the engine speed can by further limited by a reduction in the fuel supplied to the engine 12. If the updated engine speed is less than the dynamic engine speed target at the moment in time, block 516 follows block 526 and a disable signal is generated.

The various blocks described herein for method 500 may be performed sequentially, in parallel, or in a different order than those described herein. It should also be appreciated that in some implementations one or more of the illustrated blocks may be eliminated, combined or separated into additional blocks. The described and illustrated method 500 may also include various additional blocks not shown. As an example, the method 500 may further include a block for storing the current engine speed in memory, such as RAM, and block 512 may be performed earlier or later than is suggested in the method 500.

Figure 6A:
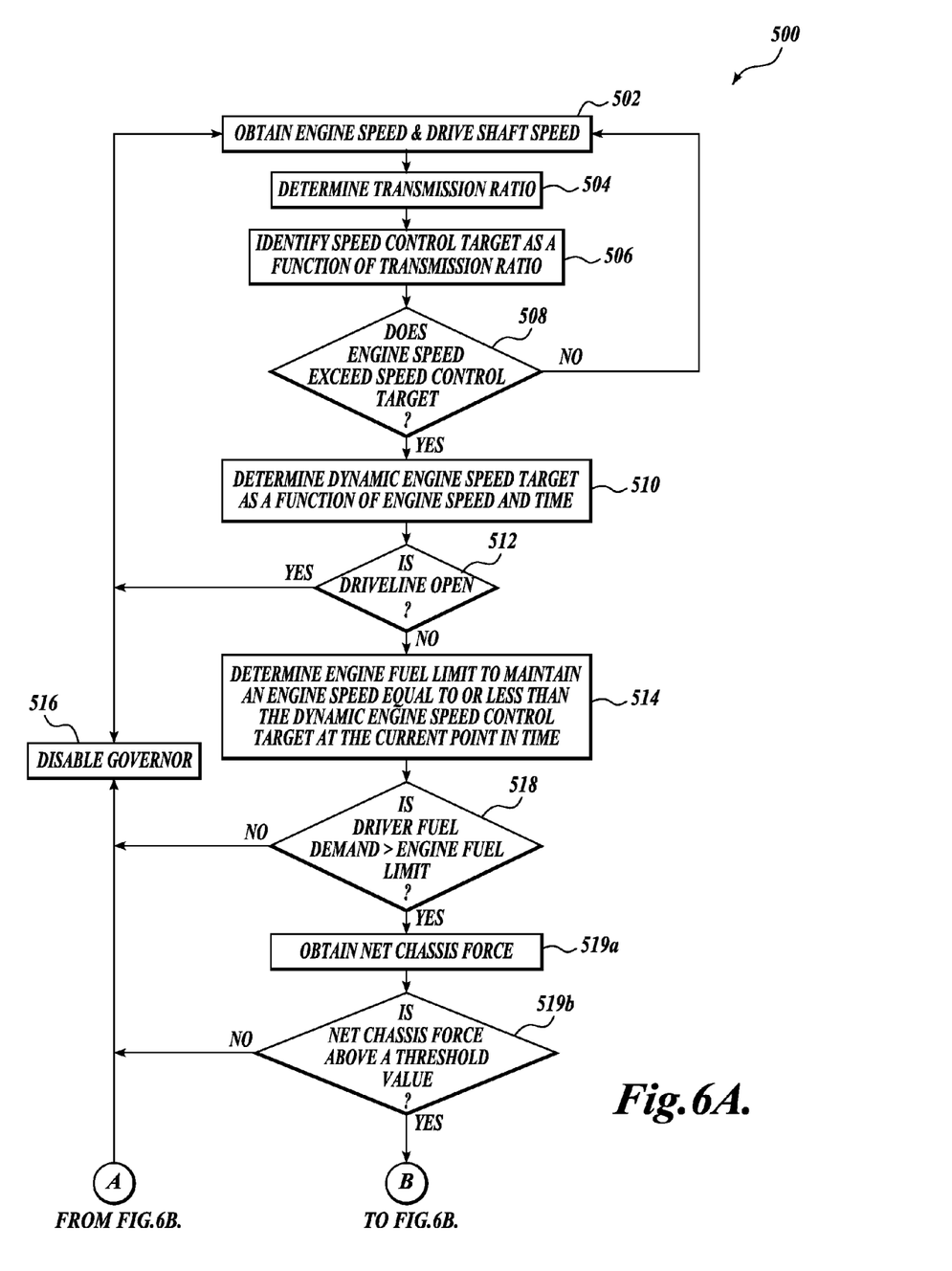
FIGS. 6A-6B are flow diagrams of another exemplary method of controlling acceleration of a vehicle that may be implemented by one or more components of a speed management system in accordance with aspects of the present disclosure.
Figure 6B:
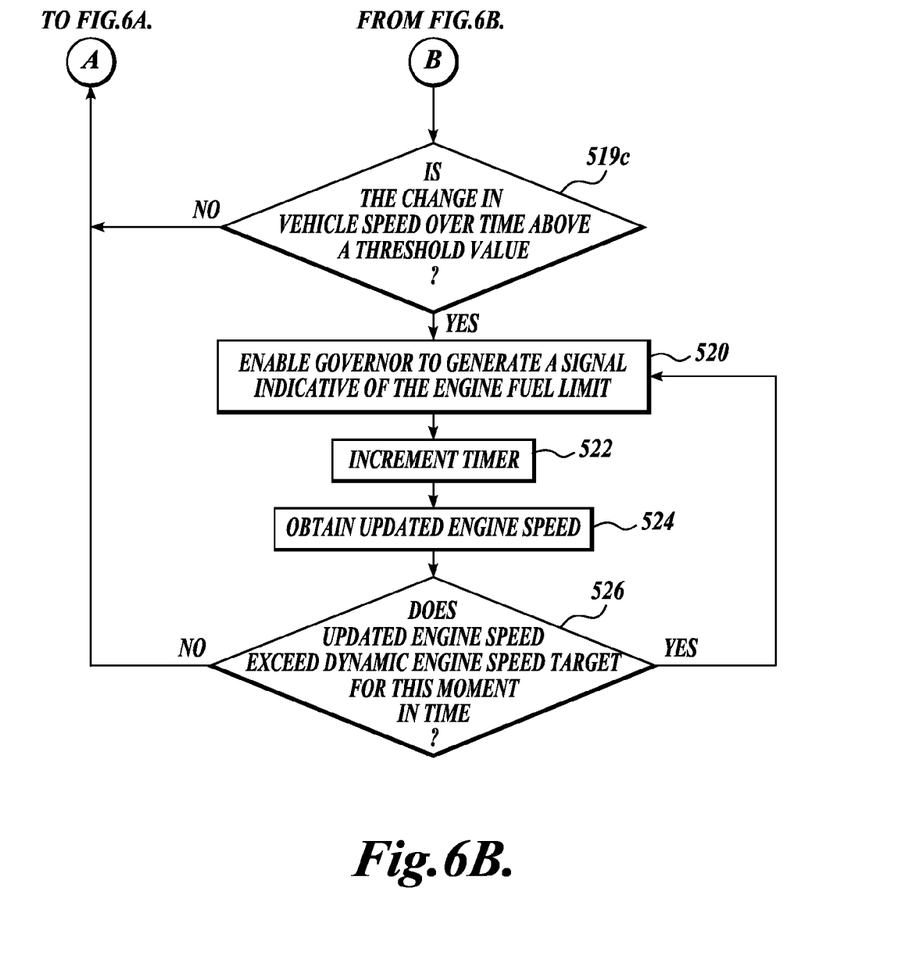

FIGS. 6A-6B are flow diagrams of another exemplary method 500' in accordance with one embodiment of the disclosure. The exemplary method 500' differs from the exemplary method 500 of FIG. 5 in that exemplary method 500' further includes block 519a, 519b, and 519c. In block 519a, the net chassis force may be obtained. Block 519a may be followed by block 519b. In block 519b, the net chassis force is compared to a threshold value. If the net chassis force is less than the threshold value, a disable signal is generated. If the net chassis force is greater than the threshold value, then block 519c follows block 519b. In block 519c, a change in vehicle speed over a predetermined amount of time (i.e., vehicle acceleration) is compared to a threshold value. If the vehicle acceleration is below the threshold value, then a disable signal is generated. If the vehicle acceleration is above the threshold value, then block 320 follows block 319c. It should be understood that the location of blocks 519a-c in method 500' is merely illustrative and may be performed in a different order than is illustrated in the figure.

In one embodiment, the net chassis force may be calculated from the following formula:

$$\frac{T(t) \cdot Tr \cdot Ar}{Rt} - \frac{1}{2} \cdot Cd \cdot A \cdot V^2 - Frr \qquad \text{Formula (5)}$$

In one embodiment, detecting the load of the vehicle may be obtained in the following manner:

Given:

Equation 1 using vehicle mass M equal to a fully loaded mass;

$t_n$ min=minimum detection time from a look-up table as a function of gear ratio;

$F_n$ min=minimum chassis force for load detection from a look-up table as a function of gear ratio.

$$\text{if } \frac{dV}{dt} \cdot (t) > V[t] - V[0] \qquad \text{Formula (6)}$$

$$\text{while } \frac{T(t) \cdot Tr \cdot Ar}{Rt} > F_n\text{min and } t > t_n\text{min}$$

then the vehicle is determined to be loaded; otherwise the vehicle is determined to be unloaded.

FIG. 7 is a graphical representation of engine speed control targets as a function of time in accordance with one embodiment of the present disclosure. The speed control targets for each gear ratio that are identified in block 506 of FIGS. 5 and 6A are illustrated graphically by stair step line 602 in FIG. 7. The first part of the line 602 indicates a preferred or optimized engine speed for shifting from first gear to second gear at 1400 RPMs.

The dynamic speed control targets determined in block 510 of FIG. 5 are illustrated by slopes 604a, 604b, and 604c. In general, the dynamic speed control targets increase with time. In some examples, each slope 604a-604c may include two distinct slopes with the first slope being steeper than the second slope. In general, the first slope may have a steepness such that the first set of dynamic engine speed targets cause the reduction in fuel supplied to the engine to be gradual and the second set of dynamic engine speed targets from the second slot cause the reduction in fuel supplied to the engine to be more aggressive. Thus, the communication to the driver indicating a shifting target may be subtle at first and becomes more obvious over time.

As is described above, slopes 604a-604c are used to determine a fuel-powered speed limit of the engine. It should be appreciated that in some embodiments, a speed limit of the engine may be higher than the fuel-powered speed limit. That is, the speed of the engine may be allowed to go above the dynamic engine speed control target. For instance, if the vehicle is traveling on a downhill grade, the gravitational force on the vehicle may cause the engine speed to rotate faster than the fuel powered engine speed limit. In order to limit the total speed that the engine can reach, in some embodiments a total engine speed limit is determined. The total engine speed limit includes an engine speed target offset of the dynamic engine speed target. The engine speed target offset is a function of current engine speed, rate of change of the engine speed, and/or current gear ratio. The engine speed target offset allows the driver, for example, to unlock the driveline when required for shifting, even when the current engine speed is above the dynamic engine speed control target. The engine speed target offset may allow the driver to shift the transmission without actuation of a clutch pedal. In one embodiment, if the rate of change of the engine speed is small (i.e., the vehicle is not accelerating or accelerating at a low rate), then the offset may be higher than if the vehicle is accelerating at a high rate.

In several embodiments, the total engine speed limit (TESL) can be calculated by the following formula, where engine speed target offset is obtained from a LUT, such as LUT 238:

TESL=Engine Speed Target Offset+Stored Engine Speed(SES)+Engine Speed Target Slope*Time     Formula (7)

In one embodiment, the offset may be delayed by a time delay (and provided, for example, by LUT 240), and the time delay may be a function of gear ratio. As will be appreciated by those skilled in the art, delaying the total engine speed limit prevents overshoot of the speed control target 602, particularly in lower gears.

In some embodiments, the dynamic engine speed target as illustrated by curve 604c may be calibrated to fall between a maximum acceleration possible for the vehicle under normally loaded conditions on a flat grade represented by dashed curve 606b and the maximum acceleration possible for the vehicle under unloaded conditions on a flat grade represented by dashed curve 606a. It will be appreciated by those skilled in the art, that the dynamic engine speed target may be calibrated to various preset configurations within the range of 606a and 606b. By calibrating the dynamic engine speed target to fall between a loaded and unloaded condition, any potential need for calculating a net chassis force on the vehicle is eliminated.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A method of inducing efficient manual transmission shifting by progressively decreasing vehicle acceleration, the method comprising:
  determining whether a rotational speed of the engine exceeds a predefined engine speed shift target;
  when the speed of the engine exceeds the engine speed shift target, identifying a starting speed the starting speed being, indicative of the rotational speed of the engine at a time in which the rotation speed of the engine exceeded the engine speed shift target;
  determining an engine speed control target based on the starting speed:
  increasing the engine speed control target over time regardless of position of an accelerator pedal; and
  limiting acceleration of the vehicle by limiting an amount of torque generated by the engine, such that a fuel powered rotational speed of the engine is equal to or less than the engine speed control target at any given point in time.

2. The method of claim 1, wherein the engine speed shift target and the engine speed control target are determined as a function of a transmission gear ratio in which the vehicle is operating.

3. The method of claim 1, wherein a value of the starting speed is different from a value of the engine speed control target and a value of the engine speed shift target.

4. The method of claim 1, wherein increasing the engine speed control target over time regardless of a position of an accelerator pedal comprises generating an engine speed control target slope as a function of the starting speed and a transmission gear ratio in which the vehicle is operating, the engine speed control target slope indicating the engine speed control target at a given point in time.

5. The method of claim 4, wherein the engine speed control target slope is a first engine speed control target slope, the method further comprising generating a second engine speed control target slope as a function of starting speed and the transmission gear ratio in which the vehicle is operating, the first engine speed control target slope being steeper than the second engine speed control target slope.

6. The method of claim 5, further comprising determining a discrete function to describe, the first engine speed control target slope and the second engine speed control target slope such that the discrete function defines the engine speed control target at a given point in time.

7. The method of claim 1, further comprising detecting whether a driveline of the vehicle is open and when the driveline is open, prohibiting the limiting of fuel being supplied to the engine.

8. The method of claim 1, further comprising allowing the rotational speed of the engine to exceed the fuel powered rotational speed of the engine by an offset.

9. The method of claim 1, wherein determining whether a rotational speed of the engine exceeds a predefined engine speed shift target comprises comparing the rotational engine speed to the engine speed shift target.

10. The method of claim 1, wherein limiting the amount of torque generated by the engine comprises limiting an amount of fuel, air, or a combination thereof supplied to the engine.

11. An electronic control unit configured to induce efficient manual transmission shifting by progressively decreasing vehicle acceleration, the electronic control unit comprising:
- a data store configured to store a current starting engine speed, a plurality of engine speed shift targets, and a plurality of speed control targets, each engine speed shift target and speed control target being a function of gear ratio;
- an engine speed control target generator configured to obtain a predetermined speed control target for the current vehicle transmission gear ratio and to determine dynamic engine speed targets as a function of time gear ratio, and current starting engine speed, wherein the dynamic engine speed targets increase over time and are not based on a position of an accelerator pedal; and
- a torque governor coupled to the engine speed limit generator and configured to generate a signal indicative of a torque limit, to be supplied to one or more devices associated with the engine, wherein the torque limit is based on the dynamic engine speed targets.

12. The electronic control unit of claim 11, wherein determining the dynamic engine speed targets comprises determining a slope of a line as a function of time and gear ratio, wherein the intercept of the line is a function of current engine speed and wherein each dynamic engine speed target is a point on the line.

13. The electronic control unit of claim 11, further comprising a comparator configured to compare a signal indicative of the torque limit to be supplied to the engine with a signal indicative of an amount of torque being requested by the driver, in the event the amount of torque requested by the driver is less than the torque limit, the speed limit governor being configured to provide a signal to the one or more devices associated with the engine indicative of the driver requested torque amount.

14. The electronic control unit of claim 11, further comprising a drive line condition detector configured to determine, whether the driveline of the vehicle is in an open position or closed position, and when the driveline of the vehicle is in the open position, the speed limit governor is configured to generate a signal indicative of a driver requested amount of torque to be supplied to the engine.

15. The electronic control unit of claim 12, wherein a value of the current starting engine speed is the same as the value of an engine speed shift target.

16. The electronic control unit of claim 12, wherein the signal indicative of a torque limit to be supplied to the one or more devices associated with the engine comprises a signal indicative of fuel, air, or a combination thereof.

17. A system for reducing acceleration of a vehicle having a current transmission gear ratio, the system comprising:
- an engine;
- a fuel control device coupled to the engine and configured to control an amount of fuel supplied to the engine in response to signals; and
- a speed control electronic control unit (ECU) coupled to the fuel control device, the speed control ECU configured to:
  - i. obtain a current transmission gear ratio and identify an engine speed shift target as a function thereof;
  - ii. determine dynamic engine speed targets as a function of the current transmission gear ratio and of time, wherein the dynamic engine speed targets increase over time and are not based on a position of an accelerator pedal;
  - iii. generate a signal indicative of an amount to limit fuel supplied to the engine based on the determined dynamic engine speed targets at a given point in time; and
  - iv. provide the signal to the fuel control device.

18. The system of claim 17, wherein the speed control ECU generates a plurality of signals over time, each signal indicative of respective amounts to limit fuel supplied to the engine based on the determined dynamic engine speed targets at respective points in time.

19. The system of claim 17, wherein the speed control ECU is further configured to detect whether the driveline is in an open position or a closed position, and when the driveline is in the open position, the speed control ECU is configured to generate a signal indicative of a driver requested fuel quantity.

20. The system of claim 17, wherein the speed control ECU is further configured to compare the amount to limit the fuel to be supplied to the engine with an amount of fuel being requested by the driver, and to provide a signal to the fuel control device indicative of the driver requested fuel amount in the event the amount of fuel requested by the driver is less than the amount of fuel to be supplied to the engine.

* * * * *

UNITED STATES PATENT AND TRADEMARK OFFICE
CERTIFICATE OF CORRECTION

PATENT NO. : 8,406,971 B2
APPLICATION NO. : 12/876001
DATED : March 26, 2013
INVENTOR(S) : C. Balton et al.

It is certified that error appears in the above-identified patent and that said Letters Patent is hereby corrected as shown below:

| COLUMN | LINE | |
|---|---|---|
| Title Page 1, Col. 1 Item (73) | Assignee | "PACCAR Inc.," should read --PACCAR Inc,-- |

In the Claims

| | | |
|---|---|---|
| 14 (Claim 1, line 7) | 16 | after "identifying a starting speed" insert --,-- |
| 14 (Claim 1, line 8) | 17 | after "being" delete "," |
| 14 (Claim 1, line 14) | 23 | before "position" insert --a-- |
| 14 (Claim 6, line 2) | 50 | after "describe" delete "," |
| 15 (Claim 11, line 12) | 12 | after "time" insert --,-- |
| 15 (Claim 11, line 18) | 18 | after "torque limit" insert --,-- |
| 15 (Claim 12, line 5) | 25 | "speed and wherein" should read --speed, and wherein-- |
| 15 (Claim 14, lines 2-3) | 38 | "determine, whether" should read --determine whether-- |

Signed and Sealed this
Twenty-seventh Day of August, 2013

Teresa Stanek Rea
*Acting Director of the United States Patent and Trademark Office*